March 21, 1961

P. B. CASON 2,975,878

APPARATUS FOR PHYSICALLY ORIENTING ELECTRICALLY
ASYMMETRICAL DEVICES

Filed June 13, 1958

Paul B. Cason,
INVENTOR.

BY.

*W H MacAllister Jr.*

ATTORNEY.

March 21, 1961

P. B. CASON 2,975,878

APPARATUS FOR PHYSICALLY ORIENTING ELECTRICALLY
ASYMMETRICAL DEVICES

Filed June 13, 1958

Paul B. Cason,
INVENTOR.

BY

ATTORNEY.

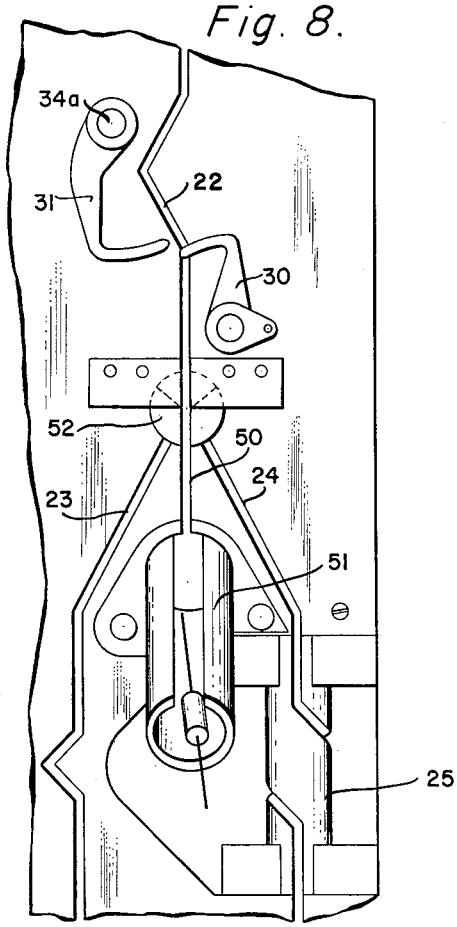
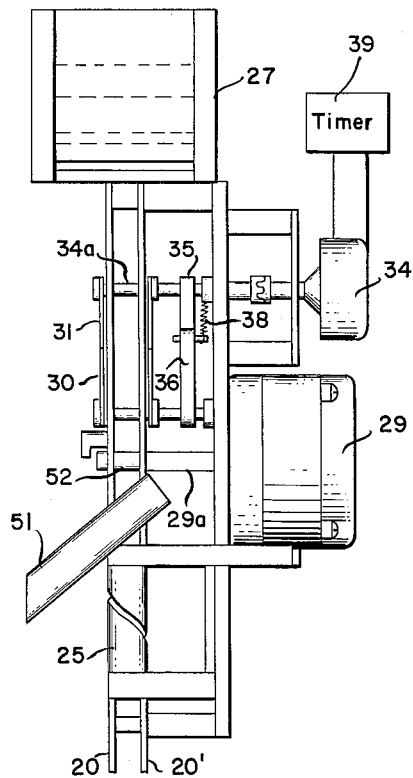
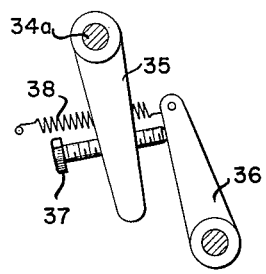
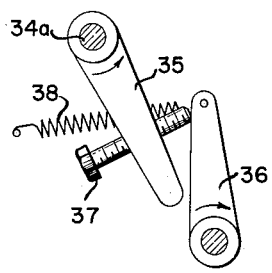
Paul B. Cason,
INVENTORS.

March 21, 1961  P. B. CASON  2,975,878
APPARATUS FOR PHYSICALLY ORIENTING ELECTRICALLY
ASYMMETRICAL DEVICES
Filed June 13, 1958  5 Sheets-Sheet 4

Paul B. Cason,
INVENTOR.
BY.

ATTORNEY.

March 21, 1961 P. B. CASON 2,975,878
APPARATUS FOR PHYSICALLY ORIENTING ELECTRICALLY
ASYMMETRICAL DEVICES
Filed June 13, 1958 5 Sheets-Sheet 5

Paul B. Cason,
*INVENTOR.*

BY.

*ATTORNEY.*

United States Patent Office 2,975,878
Patented Mar. 21, 1961

2,975,878
APPARATUS FOR PHYSICALLY ORIENTING ELECTRICALLY ASYMMETRICAL DEVICES

Paul B. Cason, Redondo Beach, Calif., assignor to Hughes Aircraft Company, Culver City, Calif., a corporation of Delaware Filed June 13, 1958, Ser. No. 741,939
11 Claims. (Cl. 193—43)

This invention relates to apparatus for orienting in a predetermined manner electrical devices which are physically symmetrical but electrically asymmetrical. More particularly, but not necessarily exclusively, the invention relates to apparatus for sorting semiconductor devices which are physically symmetrical and for arranging such devices so that they are arranged in a predetermined order with respect to their electrical dissymmetries.

It will be appreciated that certain semiconductor devices such as diodes with coaxially extending electrical leads, for example, are physically symmetrical. It will be further understood that it is substantially impractical or impossible to determine by visual inspection which end or terminal lead, for example, constitutes the cathode or anode of the device. In many applications it is highly important that such devices be physically arranged so that all of the electrically similar or corresponding terminals are arranged in the same manner. For example, prior to placing such devices on the market, it is desirable to electrically test them for operability and other electrical characteristics. Such testing requires that each device be connected into the test circuit in the proper manner. In addition, it is sometimes desirable to mount the devices in belt-like fashion on adhesive tape, in which instance it is essential, of course, that each device be disposed in an identical manner with every other device.

It is therefore an object of the present invention to accurately orient electrical devices which are physically symmetrical but electrically asymmetrical so that the devices are ultimately physically arranged in the same order according to their electrical dissymmetries.

This and other objects and advantages of the invention are achieved by providing an apparatus through which a number of electrical devices may be passed. During passage, the electrical symmetry of each device is determined and those which are found to be physically misoriented are turned 180°, for example, thereby physically arranging all devices in a single predetermined fashion.

Other objects and advantages of the invention will become apparent from the following detailed description when considered in connection with the accompanying drawings wherein:

Fig. 6 is a detailed view of the testing and switching mechanism shown in Figs. 4 and 5;

Fig. 7 is another detailed view of the switching mechanism shown in Fig. 6;

Fig. 8 is an elevational view of apparatus according to another embodiment of the invention;

Fig. 9 is a side elevational view of the apparatus shown in Fig. 8;

Figure 1:
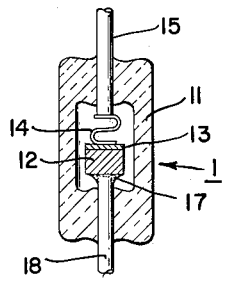
Fig. 1 is a cross-sectional, elevational view of a coaxially arranged semiconductor diode device.

Referring now to the drawings, Fig. 1 shows a semiconductor diode device 1 comprising a crystal wafer 12 of an N-type silicon, for example, having a lower lateral surface soldered to the end of a lead 18 so as to be in ohmic contact therewith. The upper lateral surface of the crystal wafer 12 is provided with a layer 13 of aluminum, for example, so as to form a rectifying junction between the P-type layer 13 and the N-type crystal wafer 12. Electrical contact to the P-type region or layer 13 is provided by means of an S-shaped whisker electrode 14 which in turn is welded or otherwise secured to the lead 15. It will be appreciated that the electrical leads for the device are coaxially arranged. Also shown is a glass package or container 11 in which the semiconductor device is disposed. The electrical leads 15 and 18 extend through the ends of the glass package 11 and are fused thereto so as to maintain the device within a hermetically sealed atmosphere. It will be understood that such a semiconductor rectifying device is electrically asymmetrical; that is, current flows easily in one direction only. Thus, for example, when properly connected in a circuit, the semiconductor device will rectify an alternating current signal impressed on the terminals 15 and 18. For example, since a P-N device has been shown and described, only the negative portion of the alternating current signal will flow across the rectifying junction in a direction toward the ohmic or base contact 18. The operation of such devices is well known in the art and need not be further described in detail herein.

Figure 2:
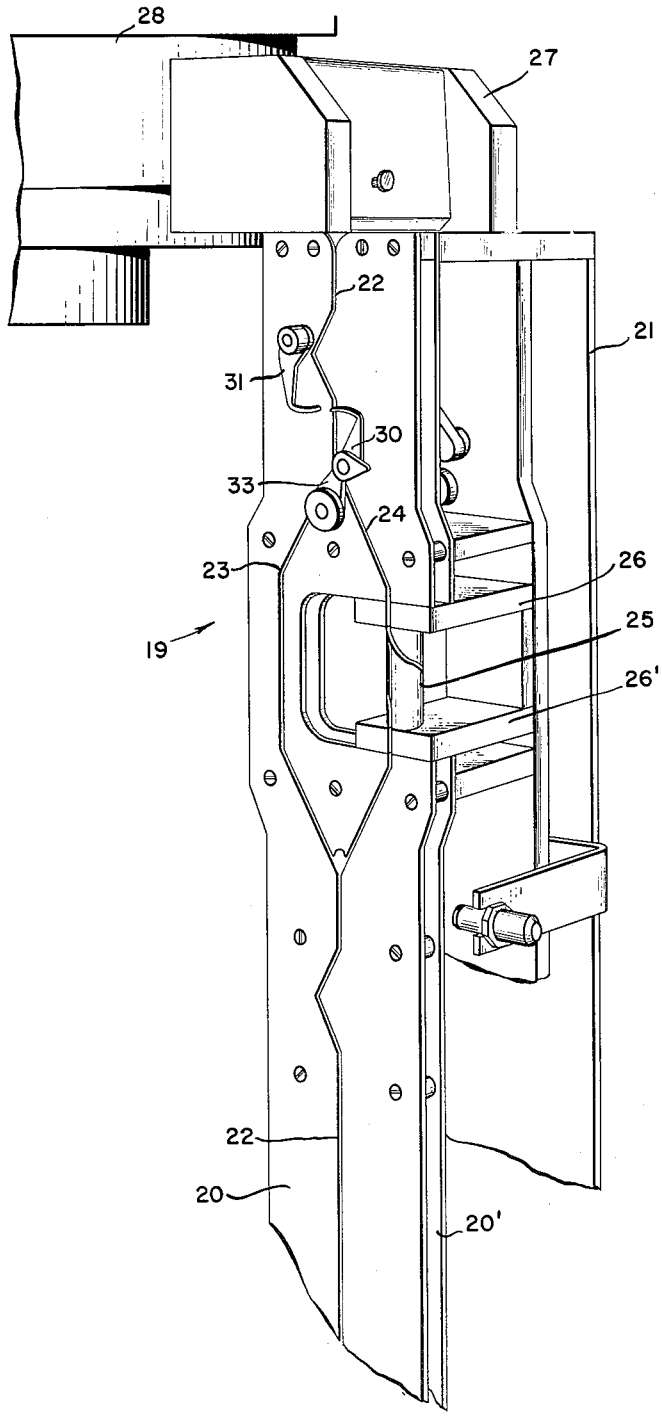
Fig. 2 is a perspective view of apparatus according to one embodiment of the invention for orienting physically symmetrical devices.
Figure 3:
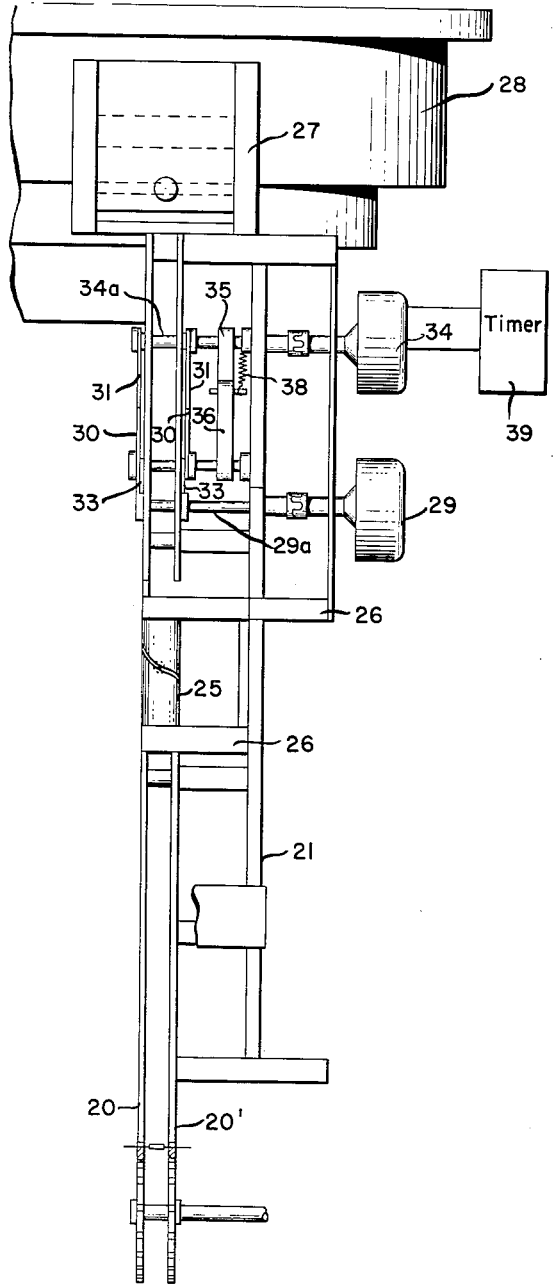
Fig. 3 is an elevational view of the apparatus shown in Fig. 2.

Referring now to Figs. 2 and 3, apparatus comprising a chute 19 is shown for orienting such physically symmetrical and electrically nonsymmetrical devices as the diode device shown in Fig. 1. The orienting chute 19 permits diode devices, for example, to be randomly fed thereto, tested to determine which is the anode and which is the cathode end of the device (or to state it differently, to identify the electrically dissimilar terminals thereof) and then to cause the device to retain its physical disposition in the chute or to be physically reversed if its orientation is not that desired.

The orienting chute 19 comprises a pair of matched track plates 20 and 20' of electrically insulating material which may be a clear plastic, for example, to permit easy visibility of the apparatus and the devices passing therethrough. The track plates 20 and 20' are bolted to each other so as to provide a space therebetween slightly larger than the longest dimensions of the glass package 11 of the semiconductor device 1 when contained therebetween. Each of the track plates 20—20' is provided with a pair of matched and aligned slots 22 running from the top to the bottom thereof. These slots are hereinafter referred to as "tracks." It will be understood that the diode device 1 may thus be inserted between the track plates at the top of the orienting chute with its leads 15 and 18 extending through the tracks 22 thereof.

Between the top and bottom of the track plates 20 and 20' the track 22 separates into two divergent branches 23 and 24 respectively. The branches 23 and 24 diverge for a short distance at an upper portion of the track plates 20 and 20' and then converge at a power portion. One of the track branches (23) maintains the disposition of a diode while the other branch (24) will cause the diode to rotate 180° as it passes therethrough. This 180° reversal of the track branch 24 is provided by means of a spirally slotted cylinder 25. The cylinder 25 actually comprises two segments which when mounted and secured in the supporting plates 26 and 26' provide the 180° reversing slot therein. It will be appreciated that the diameter of the cylinder is approximately the same as the distance between the track plates 20 and 20' so as to accommodate the glass package portion of the diode therein. Articles passed through the reversing cylinder 25 are delivered to the lower portion of the track branch which converges with the track branch 23 and joins the main track 22.

Diodes whose orientation is not known are fed into the top of the track 22 from a hopper 27 which in turn is supplied with the diodes from a sorting bowl 28. The purpose of the sorting bowl is to deliver the diodes to the hopper 27 in the same physically oriented relationship. Each diode dropping through the orienting chute 19 having the desired physical-electrical disposition will have its physical disposition maintained by causing it to enter the track branch 23. On the other hand, diodes physically mis-oriented as far as the desired electrical orientation is concerned may be physically reorineted by causing them to pass through the track branch 24 and to be reversed 180°. By the present arrangement the diodes delivered from the bottom of the orienting chute are physically and electrically oriented in the same manner.

Positioned just above the point at which the slot 22 diverges into the branches 23 and 24 is an electrical testing and track switching mechanism. The operation of this mechanism is shown in greater detail in Figs. 4 and 5. A movable pointed track selector 23 is positioned so as to block or open a particular track branch and to divert diodes into either of the track branches. It should be understood that actually two track selectors, acting as a unit, are provided, there being one for the track in each of the track plates 20 and 20'. The track branch selector or switch is normally held in a position so as to pass the diodes through the non-reversing track branch 23. The track selector or switch 33 is mounted on the shaft 29a of a torque motor 29 which motor, when energized, causes the track selector to rotate in a counterclockwise direction to close the non-reversing track branch 23 and open the reversing track branch 24. The energization of the torque motor 29 is controlled by means of a test circuit to be described in further detail hereinafter.

Figure 4:
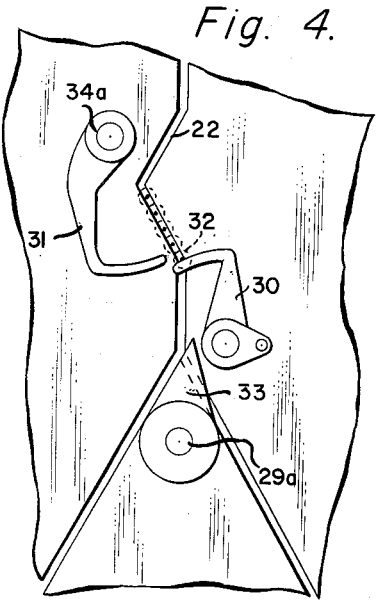
Fig. 4 is an elevational view showing the detail of the device testing and switching mechanism.
Figure 5:
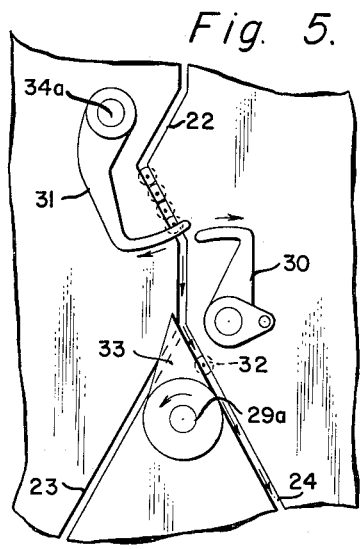
Fig. 5 is another detailed elevational view of the testing and switching mechanism.

Mounted adjacent the track 22 and above the point whereat the track diverges into the track branches 23 and 24 is a test trigger 30 and a retaining trigger 31. Fig. 4 illustrates the position of the triggers during the test period, the leads of the diode 32 extending out through the groove 22 resting upon the test trigger 30. If the diode being tested is not physically oriented as desired, a control signal is fed to the torque motor 29 causing the track selector 33 to rotate counterclockwise as described heretofore. A timed control signal from a timer 39 is fed to a second torque motor 34 on whose shaft 34a the retaining trigger 31 is mounted. The torque motor 34, upon energization, rotates in a counterclockwise direction so as to pass the paw of retaining trigger 31 between the leads of the diode under test and the leads of the diode immediately thereabove not yet tested. At the same time the test trigger 30 rotates in a clockwise direction so as to permit the diode 32, just tested, to pass on down the track 22. Actuation of the test trigger 30 will be more readily understood by reference to Figs. 6 and 7. Secured to the shaft of the torque motor 34 is a lever arm 35 which engages a similar lever arm 36 which is secured to the shaft upon which the test trigger 30 is mounted. The engagement between the lever arms 35 and 36 is achieved by means of a set screw 37 which permits the distance of movement of the lever arm 36 to be adjusted as desired. Also shown is a spring 38 secured to the upper end of the lever arm 36 so as to cause the return of the lever arms 35 and 36 to the test position upon de-energization of the torque motor 34.

Figure 13:
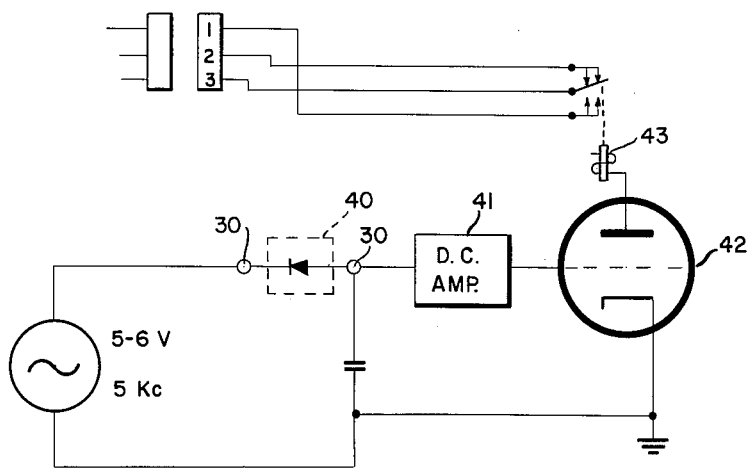
Fig. 13 is a schematic diagram of a testing circuit for use with the orienting apparatus shown in Fig. 2.
Figure 14:
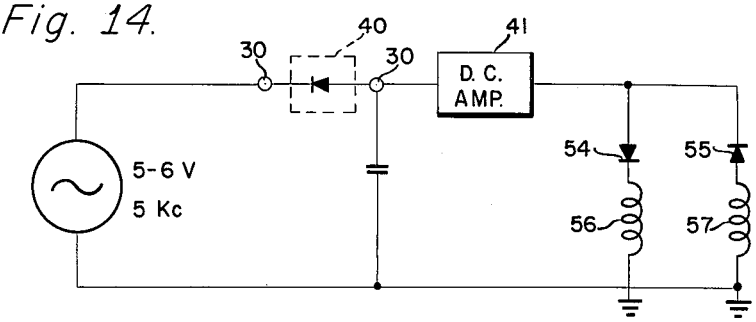
Fig. 14 is a schematic diagram of a testing circuit for use with the orienting apparatus shown in Fig. 8.

Referring now to Fig. 13 a test circuit suitable for determining the electrical disposition of a diode is shown. The diode under test is shown as contained within the dotted line box 40. During the test period when the test trigger is in contact with the leads of a diode, a five kilocycle signal of 5 or 6 volts is applied thereto. The output of the diode is fed through a D.C. amplifier 41. The normally negative output of the amplifier 41 is impressed on the grid of a triode 42 so as to bias the tube to cut-off so that the solenoid 43, which controls the energization of the torque motor 29, is not energized. In one position, the diode under test provides a negative rectified output signal to the D.C. amplifier 41 so that the negative bias on the grid of the triode 42 is only increased and the track selector torque motor 29, is not energized. Hence the diode under test will not be physically reversed. On the other hand, should the diode be positioned so as to provide a positive rectified output during the test cycle, the bias on the grid of the tube 42 drops below the cut-off value and the tube conducts so as to energize the solenoid 43 resulting in the actuation of the track selector torque motor 29 so that the diode being tested is passed to the reversing track branch 24.

Referring now to Figs. 8 and 9, another embodiment of the invention is shown which provides for the ejection of defective diodes. It will be appreciated that the orienting chute arrangement consisting of double branches must pass a given diode in one of the two branches. Thus, even a defective diode will be passed through the orienting chute by the embodiment shown and described in connection with Fig. 2. Referring now to Fig. 8 the track 22 instead of diverging into only two branches separates into three branches. The branch 23 will continue to pass the diode without physical reversal thereof to the discharge portion of the track 22. As heretofore shown, the branch 24 will feed the diodes to the reversing cylinder 25. The vertically disposed branch 50 feeds defective diodes to a slotted, open-ended cylinder 51 from whence the defective diodes may be collected. The slot in the cylinder 51 is aligned with and constitutes an extension of the track branch 50.

Figure 12:
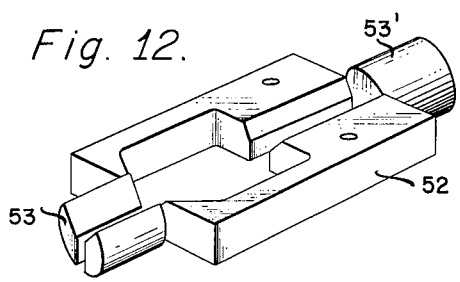
Fig. 12 is a detailed view of the switching mechanism of the apparatus shown in Figs. 10 and 11.

In this embodiment the track selector 52 consists of a one piece plastic body as shown in Fig. 12. The track selector has the general form of a rectangle with a pair of coaxial shafts 53, 53'. The rectangular portion of the track selector has an opening cut therethrough to accommodate the glass body portion of the diode while the leads thereof will pass through the slotted portion of the coaxial shaft 53 and the corresponding opposed slot in the rectangular portion. The shaft 53' is in turn secured to the shaft of a torque motor (29), as before.

The normal position of the track selector 52 is that shown in Fig. 8 whereby the track 22 is connected in a straight-through fashion to the track branch 50 and thence to the ejection cylinder 51. Thus, in the absence of any control signal to the torque motor 29, which operates the track selector 52, a diode will pass straight through and into the open-ended cylinder 51 from whence it may be collected.

The circuit permitting such control is shown in Fig.

14. A 5 kc. signal having a magnitude of 5–6 volts is impressed across the diode in a test position (indicated by the dotted lines 40). As before, the output of the diode is fed through a D.C. amplifier 41. It will be appreciated that if the diode is inserted in one position during test that its output will be a rectified signal having a given polarity while in the reverse position, the output will have the opposite polarity. The output of the D.C. amplifier is supplied simultaneously to a pair of reversed rectifiers 54 and 55 connected in parallel, each controlling the energization of solenoids 56 and 57, respectively. The solenoids 56 and 57 each in turn control the energization of the track selector torque motor 29 so as to make it turn in one of two directions. It will thus be understood that each diode under test provides either a positive or negative signal which causes the track selector to move to one of the two possible positions, thus permitting the diode to pass therethrough with or without physical reversal thereof depending upon its orientation in the track during test. A defective or shorted diode, for example, having either no signal output or an A.C. output thus will not energize the track selector and by a suitable time delay circuit (not shown) the test trigger 30 and the diode retaining trigger 31 are actuated to release the diode into the vertically descending rejection slot 50.

Figure 10:
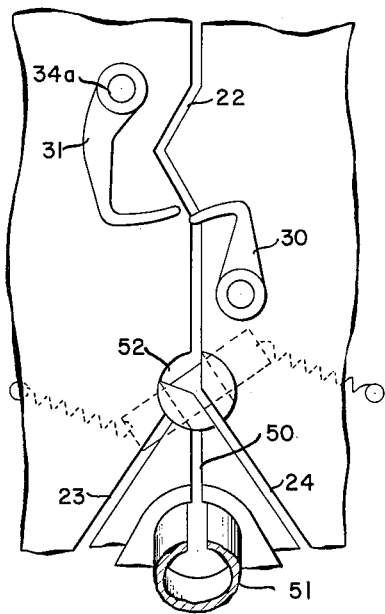
Fig. 10 is a detailed elevational view showing the testing and switching mechanism of the embodiment shown in Fig. 8.
Figure 11:
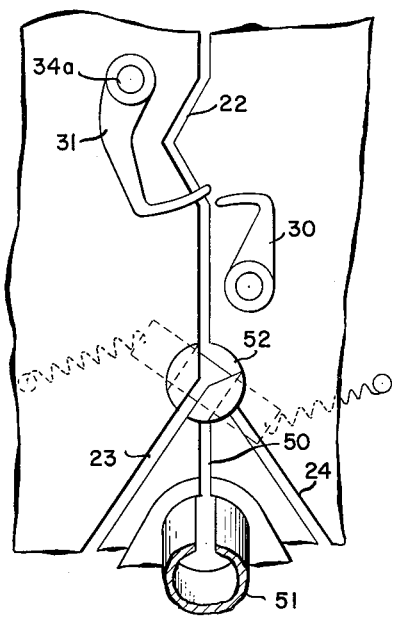
Fig. 11 is a detailed elevational view of the testing and switching mechanism of the embodiment shown in Fig. 8.

As shown in Figs. 10 and 11, the track selector 52 partially rotates either clockwise or counterclockwise to direct the diode into the reversing branch 24 of the non-reversing branch 23. It will also be understood that this embodiment of the invention is preferred because only operable diode devices are ultimately discharged from the diode orienter. Thus the orienter not only physically orients the diode but also separates defective devices from satisfactory devices.

It will thus be appreciated that according to the instant invention apparatus is provided for orienting physically symmetrical and electrically nonsymmetrical devices rapidly and accurately and is extremely useful in the assembly and mass production of such components.

What is claimed is:

1. Apparatus for orienting electrically asymmetrical devices in a conveyor to obtain a predetermined relationship between terminals on each of said devices having opposed electrically dissimilar characteristics and the physical position of said devices comprising means for arranging said devices in sequence in said conveyor in a first position randomly oriented with respect to their electrical characteristics, means for determining the relationship between said first position and the electrically dissimilar terminals of said devices, and means for changing the orientation position of said devices in said conveyor to orient said devices in said predetermined relationship.

2. Apparatus for orienting electrically asymmetrical devices to obtain a predetermined relationship between terminals on each of said devices having opposed electrically dissimilar characteristics and the physical position thereof comprising a chute for receiving and maintaining said devices in a given physical position and having a plurality of branches, at least one of said branches being adapted to change the position of said devices with respect to said chute, means associated with said chute for making electrical contact to said devices and for determining the relationship between the physical position of said devices in said chute and the electrically dissimilar terminals thereof, and means responsive to said first-named means for selectively directing said devices into one of said branches.

3. Apparatus for orienting electrically asymmetrical devices to obtain a predetermined relationship between terminals on each of said devices having opposed electrically dissimilar characteristics and the physical position thereof comprising a chute for receiving and maintaining said devices in a given physical position and having a plurality of branches between upper and lower portions thereof, at least one of said branches being adapted to change the physical disposition of said devices in said chute, and at least another of said branches being adapted to maintain the disposition of said devices in said chute, electrical circuit means associated with said chute for electrically contacting the terminals of said devices and for determining the relationship between the physical position of said devices in said chute and the electrically dissimilar terminals thereof, and means for selectively directing said devices into one of said branches in response to said electrical circuit means.

4. Apparatus for orienting electrically asymmetrical devices to obtain a predetermined relationship between terminals on each of said devices having electrically dissimilar characteristics and the physical position thereof comprising a chute for receiving and maintaining said devices in a given physical position and having a plurality of branches between upper and lower portions thereof, at least one of said branches being adapted to change the physical disposition of said devices in said chute, and at least another of said branches being adapted to maintain the physical disposition of said devices in said chute, electrical circuit means associated with said chute for electrically contacting said devices and for determining the relationship between the physical position of said devices in said chute and the dissimilar terminal characteristics thereof, and selector means for connecting one of said branches to said chute in response to said electrical circuit means whereby to direct said devices into said connected branch.

5. Apparatus for orienting devices of the type having opposed electrically dissimilar terminals comprising a chute for receiving and maintaining said devices in a given physical position without regard to the disposition of the electrical dissimilarities thereof, said chute comprising a first path which separates into a plurality of branches some of which thereafter converge to form a single terminal path, one of said converged branches having a 180° turn, electrical circuit means associated with said chute for electrically contacting said devices and for distinguishing the electrically dissimilar terminals thereof, movable means for connecting said first path to one of said branches whereby said connected branch normally constitutes a continuation of said path, and means responsive to said electrical circuit means for actuating said movable means to connect said movable means to one of said branches in accordance with the electrical disposition of said electrically dissimilar terminals of said devices.

6. Apparatus for orienting devices of the type having coaxially opposed electrically dissimilar terminals comprising a chute-forming member having a first slotted path adapted to receive and maintain said devices in a given position without regard to the disposition of the electrical dissimilarities thereof, a plurality of slotted branches connected to said first slotted path and comprising mutually independent continuations thereof, some of said slotted branches thereof being converged to form a second slotted path, one of said converging slotted branches having a 180° turn, means for selectively blocking the connection of all but one of said branches to said first slotted path, electrical circuit means associated with said first slotted path for electrically contacting said devices and distinguishing the electrically dissimilar terminals thereof, and means responsive to said electrical circuit means for actuating said selectively blocking means in accordance with the electrical disposition of said electrically dissimilar terminals of said devices in said first slotted path.

7. Apparatus for orienting physically symmetrical devices such as crystal diodes having axially aligned electrical contacts at opposed ends thereof, said contacts having opposed electrically dissimilar characteristics comprising a chute for conveying said devices by said contacts sequentially and in physically oriented alignment, a testing station for testing electrical properties of said devices while in said chute, a plurality of branch chutes each for receiving selected ones of said devices, electrical circuit means associated with said test station for electrically contacting said opposed contacts for determining the relationship between the electrical and physical disposition of said devices and means responsive to said circuit means for discharging said devices to selected branch chutes according to their electrical properties, and means in one of said branch chutes for physically reversing devices therein by turning said contacts end for end and returning each reversed device to a chute common to another one of said branches.

8. Apparatus according to claim 7 and comprising a branch chute for receiving defective devices from said testing station and discharging said defective devices from the apparatus for collection and disposition.

9. Apparatus according to claim 7 wherein said means responsive to said circuit means comprises a selector valve adjacent said testing station, and further comprising a timing means for delivering said devices one at a time from said first mentioned chute through said testing station and through said selector valve.

10. Apparatus for physically orienting physically symmetrical devices such as crystal diodes, having coaxially opposed electrically dissimilar terminals with opposite polarity electrical properties, comprising a first chute for receiving said devices with said terminals physically oriented therein and in sequence, but with said terminals randomly oriented with respect to their electrical properties, trigger means for passing said devices one at a time through said first chute, first and second branch chutes connected each to receive selected devices from said first chute and to discharge said devices from said first or second branch chute to a second chute, switch means between said first chute and said first and second branch chutes for selectively delivering devices from said first chute to one of said first and second branch chutes, electrical circuit means associated with said first chute for electrically contacting the terminals of said devices for determining the relationship between the physical position and the electrical polarity of said devices and for adjusting said switch means to deliver a device from said first chute to said first branch chute when the device has a first polarity, and to deliver a device from said first chute to said second branch chute when the device has a second polarity, said second branch chute having a reversing portion for physically reversing a device before discharging it to the second chute.

11. Apparatus according to claim 10 and comprising a third branch chute, wherein said switch means is adjustable to discharge devices from said first chute to said third branch chute, and said electrical means further comprising means for adjusting said switch means to receive said devices from said first chute and to discharge them to said third branch chute when a tested device is electrically defective.

References Cited in the file of this patent

UNITED STATES PATENTS

| | | |
|---|---|---|
| 1,768,449 | Heiny | June 24, 1930 |
| 2,468,843 | Sunstein | May 3, 1949 |
| 2,762,015 | McGrath | Sept. 4, 1956 |
| 2,769,143 | Banzhof, et al. | Oct. 30, 1956 |
| 2,845,164 | Stahl | July 29, 1958 |

FOREIGN PATENTS

| | | |
|---|---|---|
| 349,041 | Great Britain | Nov. 13, 1929 |
| 619,524 | Great Britain | Mar. 10, 1949 |